Oct. 2, 1962   C. E. GERMANO   3,056,532
INSTANT COFFEE DISPENSER
Filed Oct. 27, 1959
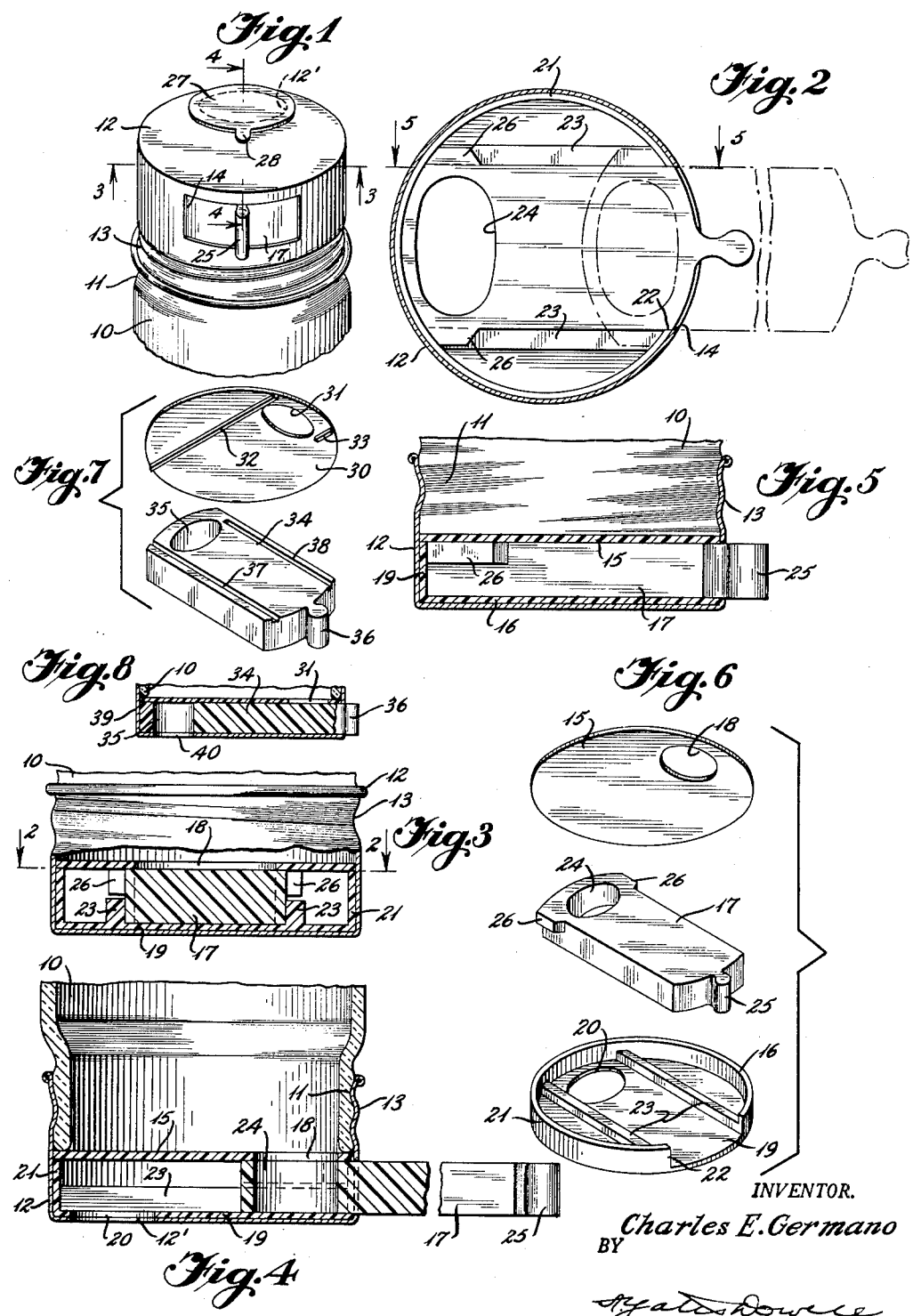
INVENTOR.
Charles E. Germano
BY
ATTORNEY

United States Patent Office
// 3,056,532
// Patented Oct. 2, 1962

3,056,532
INSTANT COFFEE DISPENSER
Charles E. Germano, Poughkeepsie, N.Y.
(38th Materiel Sqdn., APO 130, New York, N.Y.)
Filed Oct. 27, 1959, Ser. No. 849,077
2 Claims. (Cl. 222—361)

This invention relates to the holding and dispensing of small amounts of commodities of various kinds and to containers and dispensing mechanisms by which such substances may be obtained as needed or desired from the containers by housewives or other persons.

The invention relates particularly to containers used for holding coffee, tea or other substances in granular or powdered form and having means by which a measured amount, for example enough to make a desired number of cups of coffee, can be readily dispensed and the container closed tightly and kept closed during and after the dispensing operation.

Heretofore, commodities such as coffee, tea, powdered dairy products and other substances have been contained and distributed in cans, jars, and other containers having covers which could be removed to allow a portion of the contents to be obtained or dispensed from the container and then the cover replaced to keep the unused contents fresh and in air tight condition to prevent loss of flavor. Also it has been customary to use spoons and other independent measuring devices in the dispensing of the products and which devices were not always conveniently near and the handling of which due to the number thereof has required a degree of skill or dexterity.

It is an object of the invention to provide a simple and inexpensive dispensing mechanism by which a predetermined or measured amount or quantity of coffee, tea, or the like can be easily and quickly discharged or dispensed, from a can, jar, or other container and the latter closed to exclude air and moisture from the unused portion of the contents so there will be no loss of flavor, aroma, or other important characteristic of the product.

Another object of the invention is to provide dispensing mechanism in the form of a cover for a container and which cover is composed of few and inexpensive parts, which can be readily assembled and applied, and by which a desired measured fraction of the contents of the container can be quickly dispensed for use for any purpose such as for the preparation of coffee, or other beverage, or substance.

A further object of the invention is to provide a cap or cover having a dispensing slide or member which can be attached by screw threads or the like to a jar or container and used in the dispensing of the contents thereof until the supply of contained material is exhausted and after which the cap or cover can be saved and placed on another jar or container for further use.

A further object of the invention is to provide a cap or cover for a jar or other container with a dispenser located in such cap and having a disk and a cup with a slide interposed therebetween having a cavity for receiving a predetermined amount of the contents of the container through an aperture in the disk when the slide is moved outwardly and adapted to discharge the material in the cavity through an opening in the cup when the slide is moved inwardly so that the cavity is in registration with openings in the cup and the cap.

Other objects and advantages of the invention will be apparent from the following description taken in conjunction with the accompanying drawings, wherein:

FIG. 1 is a perspective illustrating one application of the invention;

FIG. 2, a transverse section on the line 2—2 of FIG. 3;

FIG. 3, an enlarged fragmentary section on the line 3—3 of FIG. 1;

FIG. 4, a section at right angles to that of FIG. 3 on the line 4—4 of FIG. 1;

FIG. 5, a section on the line 5—5 of FIG. 2;

FIG. 6, an exploded view of the dispensing mechanism which is located in the cap or cover of the container;

FIG. 7, an exploded perspective of a modified type of slide and partition; and

FIG. 8, a section of a cap to which said slide and partition are applied.

Briefly stated, the present invention is a dispenser for granular or powdered material such as instant coffee or other substances normally sold in jars or other containers. The dispenser comprises a disk, a cup and an intermediate slide fitted together and placed within the cap or cover of the container. The slide has a cavity adjacent one end and the disk and cup have diametrically opposed openings with the opening in the cup in registration with an opening in the cap or cover. The material within the container is adapted to be dispensed when the slide is moved outwardly to align the cavity in the slide and the opening in the disk and jar inverted to fill the cavity whereupon the slide is moved inwardly to its initial position to close the opening to the jar and to discharge the material within the slide cavity through the openings in the cup and the cap or cover.

With continued reference to the drawing, a jar or container 10 is provided of any desired size and configuration with a circular threaded portion 11 for the reception of a screw cap 12 having threads 13 for engagement with the threads 11 of the container 10. The top of the cap 12 is spaced from the top of the container 10 and is provided with an opening 12' at one side thereof and an opening 14 in the side wall opposite the opening 12'.

Dispensing mechanism is mounted within the cap in the space between the top of the cap and the top of the jar and comprises a flat disk 15, a cup 16 and a slide 17 fitted together in a unit. The disk 15 is provided with an oval shaped opening 18 adjacent the periphery of the disk while the cup 16 has a flat bottom 19 and an oval shaped opening 20 corresponding in size to the opening 18 adjacent the periphery thereof and a generally cylindrical wall 21 having an opening 22 in the side opposite the opening 20.

A pair of guide members 23 substantially half the height of the cylindrical wall 21 extend from the opening 22 across the bottom 19 and abut the cylindrical wall 21 diametrically opposite the opening 22.

The slide 17 is provided with a cavity 24 having substantially the same configuration as openings 18 and 20 adjacent one end of a size to accommodate a predetermined amount of material, for example, one spoonful or enough to make one cup of coffee. The opposite end of the slide is provided with a short relatively small projection or manipulating portion 25 to move the slide in and out between the guide members 23.

In order to prevent slide 17 from being fully withdrawn, the inner end is provided with a pair of lugs 26 extending outwardly one on either side of the slide and adapted to engage the cylindrical wall 21 of the cup 16 when the cavity 24 is in registration with the opening 18 in the disk 15.

In the assembling of the dispensing mechanism the slide is first placed between the guides 23 and the disk 15 is placed on top of the cup and fixed thereto, by welding, by adhesive or by other suitable means, in position such that the opening 18 of the disk is diametrically opposite the opening 20 in the cup. The longitudinal distance between the openings 18 and 20 is greater than the width of the cavity 24 in the slide so that when the slide is moved outwardly and the cavity is filled and moved inwardly, the opening 18 in the disk will be closed completely before the cavity is in a position that the contents can be discharged through the opening 20 in the cup.

The dispensing unit is placed in the cap 12 in such a position that the slide 17 can be moved outwardly through the opening 14 in the cap and the opening 22 in the cup 16 and the opening 20 in the cup is in registration with the opening 12' in the cap. When the cap thus described is screwed onto the jar or container 10 the top of the jar engages the disk 15 and forms an air-tight seal and the slide 17 prevents the free passage of air to the contents of the jar through the opening 18 in the disk.

If desired the cap may be included as the top of the jar or container or it may be a separate unit for attachment to the jar. When the cap is included as the top of the jar, it is desirable to provide the opening 12' in the top of the cap with a dust cover to exclude dirt, dust and other foreign matter from the dispensing mechanism. This is accomplished by placing a dust cover 27, which may have adhesive on one side to keep it in place, over the opening 12' and such dust cover may have a tab 28 to aid in removing it from the cap. Likewise the slide may be retained in position by any other desired securing means which may be removed before the dispensing mechanism is operated.

In FIGS. 7 and 8 is disclosed a modified form of the invention in which a partition 30 is provided with an inlet opening 31 near one edge thereof and a pair of depending guides 32 and 33. A slide 34 is also provided having a cavity 35 for a predetermined amount of material and a handle or manipulative member 36 and a pair of slots or grooves 37 and 38.

The guides 32 and 33 are received within the grooves 37 and 38 and keep the slide 34 in alignment. The guide 32 extends the full length of the partition 30, the cooperating groove 37 extends the full length of the slide 34 and in order to limit the movement of the slide 34 the guide 33 is relatively short and the cooperating groove 38 is only a portion of the length of the slide 34 so that when such slide and partition are inserted in the cap 39 the guide 33 and the groove 38 will permit the slide to move outwardly until the cavity 35 is in registration with the opening 31 of the partition.

When the slide 34 is moved inwardly the cavity 35 is in registration with a discharge opening 40 in the top of the cap adjacent the edge thereof and diametrically opposite the opening 31 in the partition.

When the cap is applied to the container 10 the partition engages the top of the container and makes an air-tight seal to prevent air from entering the jar or adversely affecting the contents of the container.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:
1. Apparatus for dispensing a predetermined amount of material in granular or powdered condition from a container comprising a cap having a generally flat top with a discharge opening therein and wall structure for engaging a portion of said container, said wall structure having an opening adjacent to said generally flat top, a dispensing unit independent of and carried within said cap, said dispensing unit including a circular disk, a cylindrical cup and a slide fitted together so that the slide is reciprocable with respect to the disk and cup, said disk having an inlet opening of a predetermined size located adjacent to the periphery thereof, said cup having a discharge opening corresponding in size to the inlet opening of said disk and located opposite and in non-registration with said inlet opening and in registration with the discharge opening in said cap, said slide having an opening of a configuration corresponding to the openings in said disk and said cup, said inlet opening and said discharge opening being spaced a distance greater than the width of said slide opening, parallel guide means extending from one side of the cylindrical wall to the opposite side of the cylindrical wall of said cup for restricting the slide to endwise movement, and an outwardly projecting lug fixed to each side of the slide and coacting with the sides of the cup to prevent the withdrawal of the slide from the cap, said slide being slidable outwardly through the opening in the wall structure of said cap to cause said slide opening to register with the inlet opening of the disk to receive material from the container and slidable inwardly to register the slide opening with the discharge opening in the cup to allow discharge.

2. Apparatus for dispensing granular or powdered material from a container comprising a cap to be connected to said container and a dispensing unit independent of and carried within said cap, said cap having a generally flat top with a discharge opening, said dispensing unit including a circular upper element having an inlet opening of a predetermined size, a cylindrical lower element having a discharge opening corresponding in size to the inlet opening of said upper element and located in non-registration with said inlet opening and in registration with the discharge opening in said cap, an intermediate element slidably mounted between said upper and lower elements and having an opening of a configuration corresponding to the openings in said upper and lower elements, the inlet opening in said upper element and the discharge opening in said lower element being spaced a distance greater than the width of the opening in said intermediate element, parallel guide means in said lower element and extending from one side of the cylindrical wall to the opposite side of the cylindrical wall for restricting the intermediate element to endwise movement, said intermediate element being movable outwardly to register the opening therein with the inlet opening of said upper element to receive material from said container and movable inwardly to register the opening in the intermediate element with the discharge opening in said lower element to discharge the material, and stop means on said intermediate element coacting with the sides of said lower element for preventing the withdrawal of said intermediate element from said cap.

References Cited in the file of this patent
UNITED STATES PATENTS

| | | |
|---|---|---|
| 1,198,014 | Dun Lany | Sept. 12, 1916 |
| 1,880,823 | Cooper | Oct. 4, 1932 |
| 1,999,624 | Biazzi et al. | Apr. 30, 1935 |
| 2,323,904 | Gerrtsen | July 13, 1943 |
| 2,553,509 | Altorfer | May 15, 1951 |
| 2,555,459 | Seufer | June 5, 1951 |
| 2,767,889 | Manrose | Oct. 23, 1956 |